(12) United States Patent
Zhou et al.

(10) Patent No.: US 12,476,617 B2
(45) Date of Patent: Nov. 18, 2025

(54) SIGNAL PROCESSING CIRCUITS AND METHODS

(71) Applicant: SHENZHEN SHOKZ CO., LTD., Guangdong (CN)

(72) Inventors: Xin Zhou, Shenzhen (CN); Lei Su, Shenzhen (CN); Yuxiang Zhang, Shenzhen (CN); Meiqi Li, Shenzhen (CN); Xin Qi, Shenzhen (CN); Fengyun Liao, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 434 days.

(21) Appl. No.: 18/183,930

(22) Filed: Mar. 14, 2023

(65) Prior Publication Data

US 2023/0218236 A1    Jul. 13, 2023

Related U.S. Application Data

(63) Continuation of application No. PCT/CN2020/142529, filed on Dec. 31, 2020.

(51) Int. Cl.
  *H03H 11/04* (2006.01)
  *A61B 5/00* (2006.01)
  *A61B 5/305* (2021.01)

(52) U.S. Cl.
  CPC .......... *H03H 11/04* (2013.01); *A61B 5/7225* (2013.01); *A61B 5/725* (2013.01); *A61B 5/0015* (2013.01);
(Continued)

(58) Field of Classification Search
  CPC ....... H03H 11/04; A61B 5/7225; A61B 5/725; A61B 5/6833; A61B 5/0015
  See application file for complete search history.

(56) References Cited

U.S. PATENT DOCUMENTS

2017/0258402 A1*  9/2017  Acquista ................ A61B 5/305
2018/0110450 A1    4/2018  Lamego et al.
(Continued)

FOREIGN PATENT DOCUMENTS

CN       2938573 Y    6/2007
CN     101119115 A    2/2008
(Continued)

OTHER PUBLICATIONS

The Second Office Action in Chinese Application No. 202011639792.9 mailed on May 31, 2025, 16 pages.
(Continued)

*Primary Examiner* — Joseph J Lauture
(74) *Attorney, Agent, or Firm* — METIS IP LLC

(57) ABSTRACT

The embodiments of the present disclosure provide a signal processing circuit and a signal processing method. The signal processing circuit may include a control circuit, a switch circuit, an analog circuit, and at least two signal acquisition circuits. The at least two signal acquisition circuits may be configured to acquire at least two-channel target signals. The switch circuit may be configured to control conduction between the at least two signal acquisition circuits and the analog circuit, so that the target signal acquired by a part of the at least two signal acquisition circuits may be transmitted to the analog circuit at the same time. The analog circuit may be configured to process the received target signal. The control circuit may be configured to receive the processed target signal and sample the processed target signal.

20 Claims, 9 Drawing Sheets

200

(52) U.S. Cl.
CPC ............. *A61B 5/305* (2021.01); *A61B 5/6833* (2013.01); *H03H 2011/0488* (2013.01)

(56) References Cited

U.S. PATENT DOCUMENTS

| | | | |
|---|---|---|---|
| 2018/0263521 A1 | 9/2018 | Stordopoulos | |
| 2018/0310887 A1 | 11/2018 | Deng | |
| 2018/0353106 A1 | 12/2018 | Han et al. | |
| 2023/0218236 A1 | 7/2023 | Zhou et al. | |

FOREIGN PATENT DOCUMENTS

| | | | |
|---|---|---|---|
| CN | 103499358 A | 1/2014 |
| CN | 104545902 A | 4/2015 |
| CN | 106301659 A | 1/2017 |
| CN | 106872849 A | 6/2017 |
| CN | 109194307 A | 1/2019 |
| CN | 111317456 A | 6/2020 |
| EP | 0148672 A1 | 7/1985 |
| FR | 2519223 A1 | 7/1983 |
| JP | S60230794 A | 11/1985 |
| JP | H02181796 A | 7/1990 |
| JP | H09186950 A | 7/1997 |
| JP | 2017055522 A | 3/2017 |
| KR | 20010001629 A | 1/2001 |
| WO | 2020236147 A1 | 11/2020 |

OTHER PUBLICATIONS

The Extended European Search Report in European Application No. 20967921.6 mailed on Sep. 28, 2023, 8 pages.

Notice of Reasons for Rejection in Japanese Application No. 2023-526099 mailed on May 27, 2024, 7 pages.

* cited by examiner

SIGNAL PROCESSING CIRCUITS AND METHODS

CROSS-REFERENCE TO RELATED APPLICATIONS

This application is a continuation of International Application No. PCT/CN2020/142529, filed on Dec. 31, 2020, the entire contents of which are hereby incorporated by reference.

TECHNICAL FIELD

The application relates to the field of circuit design, and in particular, to circuits, methods, and systems for acquiring and processing physiological signals.

BACKGROUND

As people pay more and more attention to sports science and physiological health, the demand for wearable physiological signal monitoring equipment also increases. Generally speaking, a single physiological signal monitoring apparatus can only acquire physiological signals of one signal source at the same time, but cannot satisfy the acquisition of multiple signal sources, so that the reference value of the monitoring results is limited. In addition, the acquisition and processing of multiple signal sources may cause the circuit module to be bulky and require advanced hardware at higher costs.

Therefore, the present disclosure provides time-division multiplex signal processing circuits and methods which can save space, cost and reduce hardware requirements while ensuring the acquisition and processing of multiple signal sources.

SUMMARY

One embodiment of the present disclosure provides a signal processing circuit. The signal processing circuit may include a control circuit, a switch circuit, an analog circuit, and at least two signal acquisition circuits. The at least two signal acquisition circuits may be configured to acquire at least two-channel target signals. The switch circuit may be configured to control conduction between the at least two signal acquisition circuits and the analog circuit, so that the target signal acquired by a part of the at least two signal acquisition circuits may be transmitted to the analog circuit at the same time. The analog circuit may be configured to process the received target signal. The control circuit may be configured to receive the processed target signal, and sample the processed target signal.

In some embodiments, the switch circuit may include a plurality of input channels, each of the at least two signal acquisition circuits may be connected with an input channel independently, and the switch circuit may gate one input channel for conduction between the at least two signal acquisition circuits and the analog circuit based on control signal of the control circuit at the same time.

In some embodiments, each of the at least two-channel target signals may include a target frequency, and a sampling frequency of each of the processed target signal by the control circuit may be not less than twice of the target frequency.

In some embodiments, the control circuit may reconstruct each of the target signal based on a sampling result.

In some embodiments, the control circuit may switch a switch of the switch circuit based on a sum of sampling frequencies of the at least two-channel target signals.

In some embodiments, the control circuit may switch a switch of the switch circuit based on a preset frequency.

In some embodiments, the control circuit may obtain strength information of each of the target signal based on a sampling result.

In some embodiments, the analog circuit may include a differential amplifier, and the switch circuit may be a switch chip with dual outputs.

In some embodiments, the analog circuit may further include a filter circuit.

In some embodiments, the sampling the processed target signal by the control circuit may be performed after the control circuit starts to receive the processed target signal for a time period.

One embodiment of the present disclosure provides a signal processing method. The signal processing method may include acquiring, by at least two signal acquisition circuits, at least two-channel target signals. The signal processing method may include controlling, by a switch circuit, conduction between the at least two signal acquisition circuits and the analog circuit, so that the target signal acquired by a part of the at least two signal acquisition circuits may be transmitted to the analog circuit at the same time. The signal processing method may include processing, by an analog circuit, the received target signal. The signal processing method may include receiving, by a control circuit, the processed target signal, and sampling the processed target signal.

In some embodiments, the switch circuit may include a plurality of input channels while each of the at least two signal acquisition circuits may be connected with an input channel independently and the switch circuit may gate one input channel for conduction between the at least two signal acquisition circuits and the analog circuit based on control signal of the control circuit at the same time.

In some embodiments, each of the at least two-channel target signals may include a target frequency, and a sampling frequency of each of the processed target signal by the control circuit may be not less than twice of the target frequency.

In some embodiments, the method may include reconstructing, by the control circuit, each of the target signal based on a sampling result.

In some embodiments, the method may include switching, by the control circuit, a switch of the switch circuit based on a sum of sampling frequencies of the at least two-channel target signals.

In some embodiments, the control circuit may switch a switch of the switch circuit based on a preset frequency.

In some embodiments, the method may include obtaining, by the control circuit, strength information of each of the target signal based on a sampling result.

In some embodiments, the analog circuit may include a differential amplifier, the switch circuit may be a switch chip with dual outputs, and the method may include amplifying, by the differential amplifier, the received target signal.

In some embodiments, the analog circuit may further include a filter circuit, and the method may include performing, by the filter circuit, filtering processing on the received target signal.

In some embodiments, the sampling the processed target signal by the control circuit may be performed after the control circuit starts to receive the processed target signal for a time period.

One embodiment of the present disclosure may provide a signal processing apparatus. The signal processing apparatus may include a processor. The processor may be configured to execute the above-mentioned signal processing method.

One embodiment of the present disclosure may provide a non-transitory computer-readable storage medium storing a set of instructions, when executed by at least one processor, causing the at least one processor to execute the above-mentioned signal processing method.

BRIEF DESCRIPTION OF THE DRAWINGS

The present disclosure may be further described by way of exemplary embodiments, which may be described in detail by means of the accompanying drawings. These embodiments are not limiting, and in these embodiments, the same numbers refer to the same structures, wherein.

DETAILED DESCRIPTION

Figure 1:
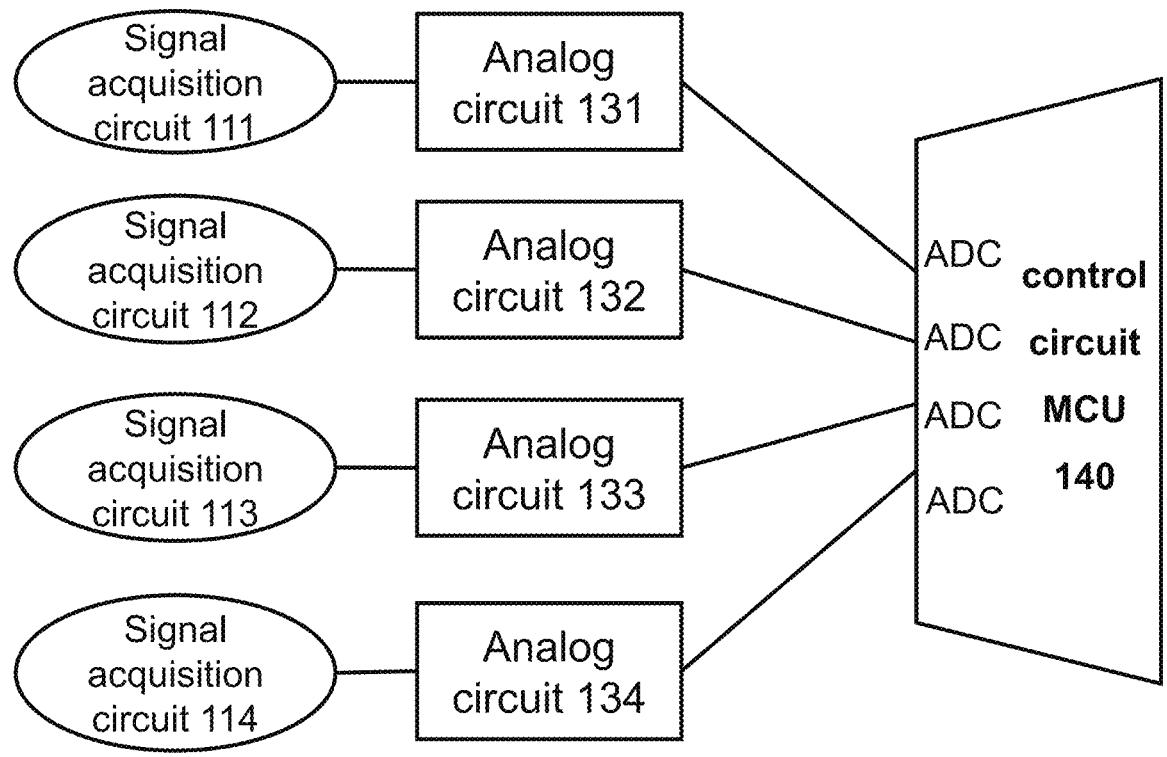
FIG. 1 is a schematic diagram of a signal processing circuit according to some embodiments of the present disclosure.

In order to more clearly illustrate the technical solutions of the embodiments of the present disclosure, the following will briefly introduce the drawings that demand to be used in the description of the embodiments. Obviously, the drawings in the following description are only some examples or embodiments of the disclosure. For those of ordinary skill in the art, without creative work, the disclosure may be applied to other similar scenarios according to these drawings. Unless it is obvious from the language environment or otherwise stated, the same reference numbers in the drawings represent the same structure or operation.

It should be understood that the "system", "apparatus", "unit" and/or "module" used herein is a method for distinguishing different components, elements, parts, portions, or assemblies of different levels. However, if other words may achieve the same purpose, the words may be replaced by other expressions.

As shown in the present disclosure and the claims, unless the context clearly suggests exceptional circumstances, the words "a", "an", and/or "the" do not only specifically refer to the singular form, but also include the plural form; the plural form may be intended to include the singular form as well. Generally speaking, the terms "including," "includes," "include," "comprise," "comprises," and "comprising," only suggest that the operations and/or elements that have been clearly identified are included, but these operations and/or elements do not constitute an exclusive list, and the method, system, or apparatus may also include other operations or elements.

Flowcharts are used in the present disclosure to describe operations performed by a system according to an embodiment of the present disclosure. It should be understood that the preceding or following operations are not necessarily performed in the exact order. Instead, the various operations may be processed in reverse order or simultaneously. Also, other operations may be added to these procedures, or an operation or operations may be removed from these procedures.

The signal processing circuit and method described in the embodiments of the present disclosure may be applied to a signal monitoring apparatus that needs to acquire multiple signal sources, especially a physiological signal monitoring apparatus, such as a smart wearable apparatus. In some embodiments, the smart wearable apparatus (e.g., clothing, wristbands, shoulder straps, etc.) may be set on various parts (e.g., calves, thighs, waist, back, chest, shoulders, neck, etc.) of a human body, which is used to acquire physiological signals of various parts of the user's body in different states, and process the acquired signals. In some embodiments, the physiological signals may be signals that can be detected and reflect states of the body. For example, the physiological signals may include various signals such as respiratory signals, electrocardiograms (ECG), electromyographic signals (EMGs), blood pressure signals, and temperature signals. In some embodiments, a frequency range of the physiological signal may be 0.05 Hz-2 kHz, the frequency range of the ECG signal may be 0.05 Hz-100 Hz, and the frequency range of the EMG may be 5 Hz-2 kHz.

FIG. 1 is a schematic diagram of a signal processing circuit according to some embodiments of the present disclosure.

As shown in FIG. 1, the signal processing circuit 100 may realize the acquisition and processing of multiple physiological signals. Specifically, the signal processing circuit 100 may be respectively configured with corresponding signal acquisition circuits and analog circuit for different signal sources. For example, a signal acquisition circuit 111 (112, 113, 114) may include one or more electrodes in contact with a user's body, and the EMGs on the user's body surface may be acquired through the electrodes. The EMG s acquired by the signal acquisition circuit 111 (112, 113, 114) may be transmitted to an analog circuit 131 (132, 133, 134) for proper processing (e.g., a noise reduction, an amplification, etc.), and the processed EMGs may be transmitted to a control circuit (MCU) 140 for signal analysis. In this case, the control circuit 140 may need to have analog-to-digital conversion channels (i.e., ADC channels) corresponding to multiple signal sources. In some embodiments, the analog circuit may include elements such as differential amplifiers, multi-stage amplifier circuits, and filter circuits. Since the cost of each element is not cheap, arranging a plurality of analog circuit in the signal processing circuit 100 may make the circuit structure too complicated and bulky, and generate higher cost. In addition, due to the large number and the large volume of channels of the analog circuit, the circuit layout may also be limited, which may cause problems such as channel crosstalk. For the control circuit 140, it is necessary to have higher requirements for its pins, but the number of ADC channels of the actual control chip is very limited. For example, taking the control chip with model STM32L476 as an example, only 16 ADC channels are available.

Figure 2:
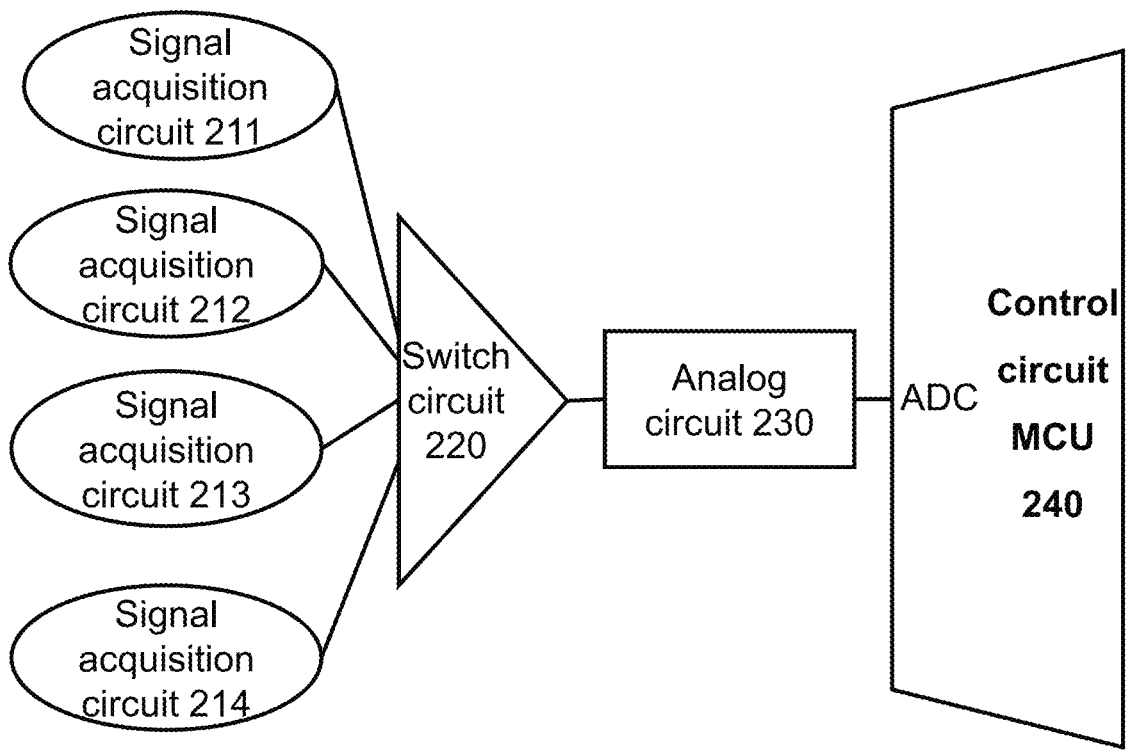
FIG. 2 is a schematic diagram of a signal processing circuit according to some embodiments of the present disclosure.

FIG. 2 is a schematic diagram of a signal processing circuit according to some embodiments of the present disclosure.

The signal processing circuit 200 shown in FIG. 2 may also realize the acquisition and processing of multiple physiological signals. Compared with the signal processing circuit 100, the signal processing circuit 200 adopts the time-division multiplexing method to save space cost and reduce hardware requirements while ensuring the acquisition and processing of multiple signal sources. Specifically, the signal processing circuit 200 may include at least two signal acquisition circuits (e.g., signal acquisition circuits 211, 212, 213, and 214), a switch circuit 220, an analog circuit 230, and a control circuit 240. The switch circuit 220 may be arranged between the multiple signal acquisition circuits and the analog circuit 230, and may be configured to control a conduction state of each signal acquisition circuit and the analog circuit 230. For example, at a certain time point, the switch circuit 220 may conduct the signal acquisition circuit and the analog circuit 230. Within a certain time range, the switch circuit 220 may cyclically conduct various signal acquisition circuits and the analog circuit 230 in a periodic manner. When the switch circuit 220 conducts a certain signal acquisition circuit and the analog circuit 230, signals (e.g., EMGs) acquired by the signal circuit may be transmitted to the analog circuit 230 for processing (e.g., a noise reduction, an amplification, etc.), and the processed signals may be transmitted to the control circuit 240 for signal analysis. It can be understood that, by arranging the switch circuit 220 between the multiple signal acquisition circuits and the analog circuit 230, the same analog circuit may process the signals of different signal acquisition circuits at different time points, which may effectively reduce the complexity and cost of using multiple analog circuit, and also reduce the number of channels for signal transmission between subsequent analog circuit and control circuits. It should be known that the switch circuit 220 and the analog circuit 230 shown in FIG. 2 are only for the purpose of illustration. In actual use, more than one switch circuit or analog circuit may also be used between the multiple signal acquisition circuits and the control circuit 240, and these switch circuits or analog circuit may still realize the process similar to the above description.

In some embodiments, the at least two signal acquisition circuits may be configured to acquire at least two-channel target signals. The target signals may be physiological signals capable of reflecting a user's physical state, for example, one or more signals among respiratory signals, electrocardiograms (ECG), EMGs, blood pressure signals, temperature signals, or the like. As an example only, different signal acquisition circuits may respectively include one or more electrodes in contact with the user's body, the EMGs on the user's body surface may be acquired through the electrodes. Different signal acquisition circuits may be arranged in different positions of the user's body for acquiring physiological signals of the same or different types of users. For example, the signal acquisition circuits arranged on different sides of the user's thighs may all be configured to acquire the electromyography signals at the thighs. For another example, the signal acquisition circuits arranged at the forearm of the user may be configured to acquire the EMGs at the forearm, and the signal acquisition circuits arranged at the heart of the user may be configured to acquire the electrocardiographic signals of the user. It should be known that, in a certain scenario, the signal processing circuit 200 or the similar circuits may be configured to acquire and process the above-mentioned same or different physiological signals, which is not limited. In some embodiments, the at least two signal acquisition circuits may only include two signal acquisition circuits, or may include three signal acquisition circuits, four signal acquisition circuits, or more signal acquisition circuits. In some embodiments, a frequency range of the physiological signal may be 0.05 Hz-2 kHz, the frequency range of the ECG signal may be 0.05 Hz-100 Hz, and the frequency range of the EMG may be 5 Hz-2 kHz.

The control circuit 240 may sample signals processed by the analog circuit 230. In some embodiments, a sampling frequency of the control circuit 240 may be related to the number of the signal acquisition circuit, control strategies for the switch circuit, and the target frequency. For example, the sampling frequency of each signal by the control circuit 240 may be not less than twice of a target frequency of the control circuit. As an example only, for the EMG, assuming that the corresponding target frequency is less than or equal to 1000 Hz, the control circuit may sample the EMG at a sampling frequency of 2000 Hz. For the entire signal processing circuit, assuming that there are four signal acquisition circuits for acquiring EMGs, it is necessary to the control circuit 240 to provide a total sampling frequency of 8000 Hz, so as to ensure that the sampling frequency of each EMG reaches 2000 Hz. For another example, as mentioned elsewhere in the present disclosure, the control circuit 240 may adopt a completely reconfigurable strategy and a strength characterization strategy to control a switching of the switch circuit 220. In the completely reconfigurable strategy, the sampling frequency may be related to the number of the signal acquisition circuit, a rising edge time and a falling edge time of a single channel, and the rising edge time and the falling edge time of the single channel may be related to a magnification of the analog circuit and a slew rate of the circuit element.

In some embodiments, the switch circuit 220 may be configured to control the conduction between the at least two signal acquisition circuits and the analog circuit 230, so that the target signals acquired by a part of the at least two signal acquisition circuits may be transmitted to the analog circuit 230 at the same time. An input end of the switch circuit 220 may be connected with the at least two signal acquisition circuits, and an output end of the switch circuit 220 may be connected with the analog circuit 230. In some embodiments, the switch circuit 220 may include a plurality of input channels, and each signal acquisition circuit of the at least two signal acquisition circuits may be connected with one input channel independently, and the switch circuit 220 may gate one input channel for conduction between the at least two signal acquisition circuits and the analog circuit based on control signal of the control circuit 240 at the same time.

In some embodiments, the switch circuit 220 may gate a switch chip with multiple channels and dual-channel outputs, for example, the switch chip whose model is TMUX1209. As an example only, the switch circuit 220 may realize time-division multiplexing of 4 channels through 3 control pins, 1 pin EN is marked as enabling function, and the other 2 pins A1 and A0 are marked as gating channel. The 4 input channels of the switch circuit 220 may be respectively configured to connect to the signal acquisition circuits to acquire target signals, and the output ports of the switch circuit 220 may be connected with the analog circuit 230. In some embodiments, the gating of the switch chip may be controlled by controlling values of the pins (EN, A1, A0). For example, when inputting (1, 0, 0), it means that channel A is gated. When inputting (1, 0, 1), it means that channel B is gated. When inputting (1, 1, 0), it means that channel c is gated. When inputting (1, 1, 1), it means that channel D is gated. As an example only, when the control circuit 240 gates the channel A of the switch circuit 220, the target signal corresponding to the channel A may be connected with the analog circuit 230 and finally sampled by the control circuit 240. When the sampling is successful, the control circuit 240 may give a new control instruction, for example, an instruction (1, 0, 1) may be given to gate channel B, then the target signal of channel B may be connected with the analog circuit 230 and finally sampled by the control circuit 240, and so on. That is, the control circuit 240 may control the switch circuit 220 to cyclically switch between the multiple signal acquisition circuits, so as to achieve the function of time-division multiplexing, that is, one analog circuit 230 may be configured to process multiple signal sources in time-division, thereby saving space costs and reducing hardware requirements.

In different situations, the control circuit 240 may control the switching of the switch circuit 220 based on different strategies.

For example, in order to enable subsequent sampling data to fully retain the information of each target signal (that is, the control circuit 240 may reconstruct each target signal based on the sampling data), the control circuit 240 may use the completely reconfigurable strategy to control the switching of the switch circuit 220. Under the completely reconfigurable strategy, the control circuit 240 may switch the input channels of the switch circuit 220 according to the total sampling frequencies provided by the control circuits. For example, the frequency at which the switch circuit 220 switches the input channels may be equal to the sampling frequency provided by the control circuit 240. In this case, the switch circuit 220 switches the input channels every time, that is, a signal acquisition circuit may be conducted every time, the control circuit 240 may sample the target signals acquired by the signal acquisition circuit once. Moreover, since the sampling frequency of each target signal by the control circuit 240 is more than twice of the target frequency, the completely reconfigurable strategy may ensure that each target signal has at least two sampling points in each cycle. More descriptions of the completely reconfigurable strategy may be found in the FIG. 3 and its related descriptions.

For another example, considering that the control circuit 240 may not be able to obtain valid sampling data during a fast switching of the switch channel (due to the switching of the switch channel mentioned below, there may be certain rising edge and falling edge in the signal received by the control circuit 240), the control circuit 240 may adopt a strength characterization strategy to control switching of the switch circuit 220. Under the strength characterization strategy, the control circuit 240 may switch the input channels of the switch circuit 220 based on a preset frequency. The preset frequency may be related to a cycle for the user to perform a certain action. For example, in order to analyze the EMGs generated by the muscles when the user performs a strength training, the preset frequency may be a certain multiple of the frequency at which the user performs a specific action (e.g., bench press), causing that in the cycle for the user to perform the specific action, the switch circuit 220 may conduct each signal acquisition circuit multiple times, so that the control circuit 240 may respectively perform multiple samplings on each target signal. Under the strength characterization strategy, the control circuit 240 may acquire the strength information of each target signal based on a sampling result. More descriptions of the strength characterization strategy may refer to the FIG. 3 and its related descriptions.

The analog circuit 230 may be configured to process the target signals received by the analog circuit. In some embodiments, since an amplitude of the original target signal directly acquired by the signal acquisition circuit is very small and there is a lot of noise, it is necessary to use the analog circuit 230 to filter, differentially amplify, amplify, negative feedback and denoise the original target signal, etc. In some embodiments, the analog circuit 230 may include differential amplifiers for suppressing common-mode signals and amplifying the received target signals. In some embodiments, the analog circuit 230 may include multi-stage amplification circuits for amplifying the received target signals. In some embodiments, the analog circuit 230 may include filter circuits for filtering the received target signals. In some embodiments, the analog circuit 230 may include right-leg driving circuits for extracting the common-mode signals in the target signals received by the analog circuit. After inverse amplification, the common-mode signals may be fed back to the signal sources, which can mainly suppress the power frequency in the signal sources. In some embodiments, the analog circuit 230 may include differential amplifiers, multi-stage amplifiers, filter circuits and right-leg driving circuits at the same time, or only one or more of them.

As mentioned above, the control circuit 240 may be configured to receive the target signals processed by the analog circuit, and sample the processed target signals. In some embodiments, the control circuit 240 may include multiple ADC channels, and each ADC channel may be configured to convert the target signals received and processed by the analog circuit 230 into digital signals for reading and processing. In some embodiments, the control circuit 240 may also be connected with a display apparatus to display the read digital signals, so as to intuitively reflect situations of the physiological signals. In some embodiments, based on the sampling, the control circuit 240 may read, store, process and analyze the target signals, and optionally, the control circuit 240 may also issue corresponding instructions according to the sampled data.

In some embodiments, the sampling of each processed target signals by the control circuit 240 may be performed after the control circuit 240 starts to receive each processed target signals for a time period. That is, after the switch circuit 220 switches the conduction channels, the control circuit 240 may not immediately sample the newly-conducted target signals, or even if the control circuit 240 samples the newly-conducted target signals, it may not immediately use the sampling result as a part of the target signals. When the time-division multiplexing method is configured to acquire the target signals from multiple signal sources, the switching of the switch channels may cause the signals received by the control circuit 240 to have certain rising edge and falling edge. The rising edge is a signal under the time required for the signal at the output end to rise to a steady state, which is caused by a signal change at the input end. The falling edge is a signal under the time required for the signal at the output end to fall to the steady state, which is caused by a signal change at the input end. The rising edge and falling edge may be affected by multiple factors, including the response stabilization speeds of the switch circuits, the voltage slews of the chips in the circuits, and the charging and discharging of apparatus such as capacitors in the circuits. Therefore, in order to ensure that the target signals read by the control circuit 240 are true and valid, the sampling of the target signals may be performed after the signals are stable, that is, after the switch circuit 220 switches the conduction channels, the control circuit 240 does not sample the signals during the rising edge time. If the sampling is started without waiting for enough time, the final value read by the control circuit 240 may be an intermediate transition value. It can be understood that, if the rising edge time is fixed, even if the waiting time is insufficient, the final transition value may be consistent with the actual value and may be used for subsequent processing and analysis. However, when the rising edge time is related to the magnitude of the voltage change, if the control circuit reads when the signal is not stabilized, the ratio of the value read by the control circuit 240 to the real value may be not fixed every time, which cannot be used for subsequent processing. In addition, it can be understood that, if the relationship between the transition value and the stable value is considered clearly, or the error between the transition value and the stable value is acceptable, then even if the waiting time is insufficient, it may be used for subsequent processing and analysis. To sum up, the strength of the target signals and the gains of the circuit should be considered to obtain the maximum rising edge time as a reference for the waiting time of the control circuit 240. Specifically, the reference time not less than the maximum rising edge time may be set, and the sampling of each target signal by the control circuit 240 may be performed after the reference time when the control circuit 240 starts to receive the target signal, or the sampling of the target signal by the control circuit 240 may be performed after reference time when the switch circuit switches the conduction channels every time.

Figure 3:
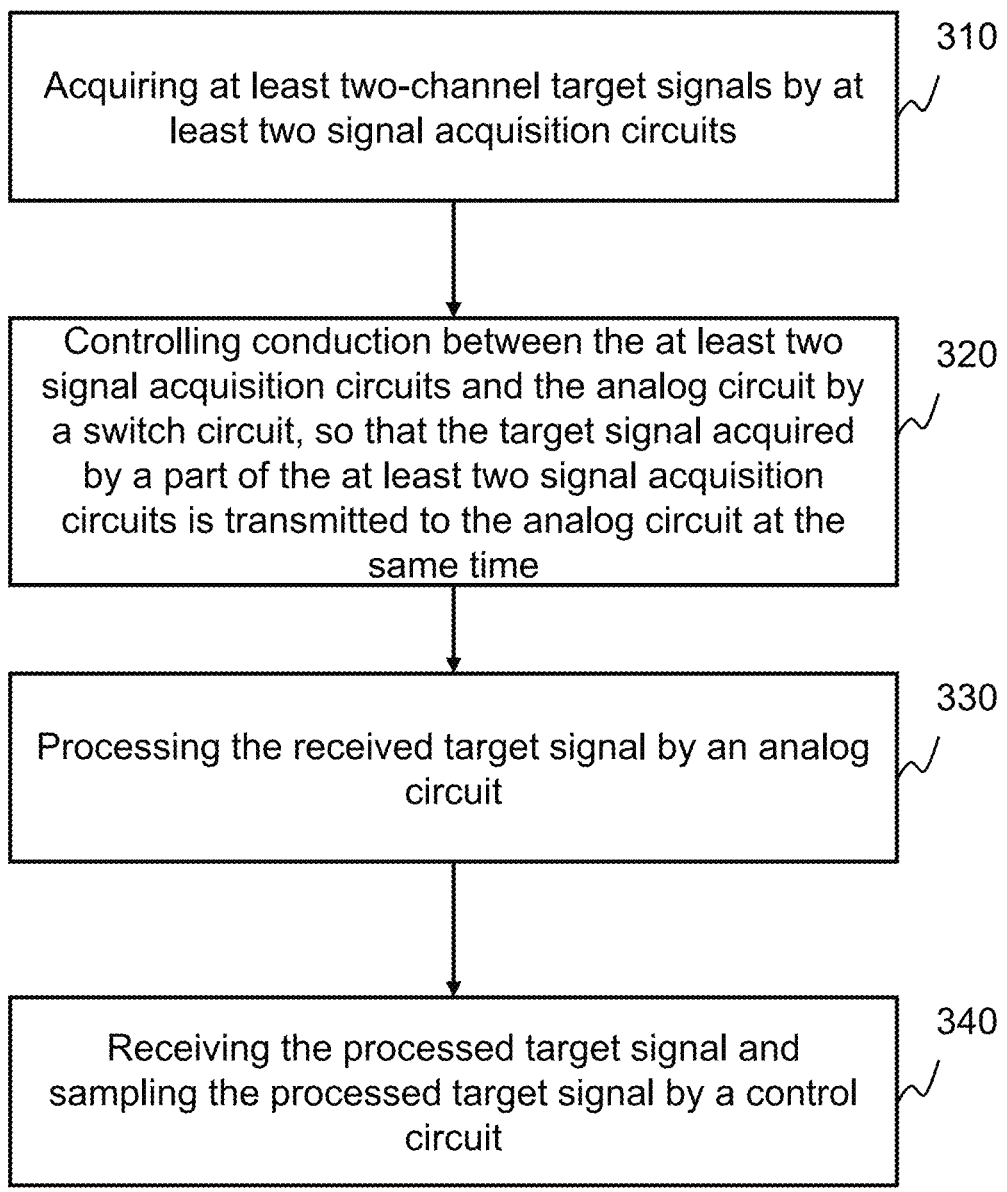
FIG. 3 is an exemplary flowchart of a signal processing method according to some embodiments of the present disclosure.

FIG. 3 is an exemplary flowchart of a signal processing method according to some embodiments of the present disclosure. In some embodiments, process 300 may be implemented by the signal processing circuit 200.

In operation 310, acquiring at least two-channel target signals by at least two signal acquisition circuits. In some embodiments, the operation 310 may be implemented by at least two signal acquisition circuits (e.g., signal acquisition circuits 211, 212, 213, and 214) of the signal processing circuit 200.

In some embodiments, the at least two signal acquisition circuits may be configured to acquire the at least two-channel target signals. The target signals may be physiological signals capable of reflecting a user's physical state, for example, one or more signals among respiratory signals, electrocardiograms (ECG), EMGs, blood pressure signals, temperature signals, or the like. As an example only, different signal acquisition circuits may respectively include one or more electrodes in contact with the user's body, the EMGs on the user's body surface may be acquired through electrodes. Different signal acquisition circuits may be arranged in different positions of the user's body for acquiring physiological signals of the same or different types of users. For example, the signal acquisition circuits arranged on different sides of the user's thighs may all be configured to acquire the electromyography signals at the thighs. For another example, the signal acquisition circuits arranged at a forearm of the user may be configured to acquire the EMGs at the forearm, and the signal acquisition circuits arranged at a heart of the user may be configured to acquire the electrocardiographic signals of the user. It should be known that, in a certain scenario, the signal processing circuit 200 or the similar circuits may be configured to acquire and process the above-mentioned same or different physiological signals, which is not limited. In some embodiments, the at least two signal acquisition circuits may only include two signal acquisition circuits, or may include three signal acquisition circuits, four signal acquisition circuits, or more signal acquisition circuits. In some embodiments, a frequency range of the physiological signal may be 0.05 Hz-2 kHz, the frequency range of the ECG signal may be 0.05 Hz-100 Hz, and the frequency range of the EMG may be 5 Hz-2 kHz.

In operation 320, controlling conduction between the at least two signal acquisition circuits and the analog circuit by a switch circuit, so that the target signal acquired by a part of the at least two signal acquisition circuits is transmitted to the analog circuit at the same time. In some embodiments, the operation 320 may be implemented by a switch circuit 220 of the signal processing circuit 200.

In some embodiments, an input end of the switch circuit 220 may be connected with the at least two signal acquisition circuits, and an output end of the switch circuit 220 may be connected with the analog circuit 230. In some embodiments, the switch circuit 220 may include a plurality of input channels, and each of the at least two signal acquisition circuits may be connected with an input channel independently, and the switch circuit 220 may gate one input channel for conduction between the at least two signal acquisition circuits and the analog circuit based on control signal of the control circuit at the same time.

In some embodiments, the switch circuit may implement the conduction between the signal acquisition circuits and the analog circuit based on the control instructions of the control circuits. Taking the time-division multiplexing of 4 channels described above as an example, when the control circuit 240 gates the channel A of the switch circuit 220, the target signals corresponding to the channel A may be connected with the analog circuit 230, and finally sampled by the control circuit 240. When the sampling is successful, the control circuit 240 may give a new control instruction, for example, an instruction may be given to gate channel B, then the target signal of channel B may be connected with the analog circuit 230 and finally sampled by the control circuit, and so on. That is, the control circuit 240 may control the switch circuit 220 to cyclically switch between the multiple signal acquisition circuits, so as to achieve the function of time-division multiplexing, i.e., one analog circuit 230 may be configured to process multiple signal sources in time-division, thereby saving space costs and reducing hardware requirements.

In operation 330, processing the received target signal by an analog circuit. In some embodiments, the operation 320 may be implemented by the analog circuit 230 of the signal processing circuit 200.

In some embodiments, since the amplitude of the original target signals directly acquired by the signal acquisition circuits is very small, and there is a large amount of noise, it is necessary to use the analog circuit 230 to filter, differentially amplify, amplify, negative feedback and denoise the original target signals, etc. In some embodiments, the analog circuit 230 may include differential amplifiers for suppressing common-mode signals and amplifying the received target signals. In some embodiments, the analog circuit 230 may include multi-stage amplification circuits for amplifying the received target signals. In some embodiments, the analog circuit 230 may include filter circuits for filtering the received target signals. In some embodiments, the analog circuit 230 may include right-leg driving circuits for extracting the common-mode signals in the target signals received by the analog circuit. After inverse amplification, the common-mode signals may be fed back to the signal sources, which can mainly suppress the power frequency in the signal sources. In some embodiments, the analog circuit 230 may include differential amplifiers, multi-stage amplifiers, filter circuits and right-leg driving circuits at the same time, or only one or more of them.

In some embodiments, considering the situation that there may be baseline drift, the baseline drift problems may be solved by reducing the gains of the analog circuit to the target signals (i.e., reducing the magnification in the analog circuit), and/or gating a control chip with a high-precision ADC channel, and/or choosing to use resistance to adjust the reference potential, and/or the baseline drift may be filtered out by choosing to add high-pass filtering in the analog circuit 230. More descriptions of how to solve the baseline drift problems may refer to FIGS. 4A-4B and FIGS. 5A-5C and their related descriptions thereof.

In operation 340, receiving the processed target signal, and sampling the processed target signal by a control circuit. In some embodiments, the operation 320 may be implemented by the control circuit 240 of the signal processing circuit 200.

In some embodiments, the control circuit 240 may include multiple ADC channels, and each ADC channel may be configured to convert the received target signals processed by the analog circuit 230 into digital signals for reading and processing. In some embodiments, the control circuit 240 may also be connected with a display apparatus to display the read digital signals, so as to intuitively reflect the situations of the physiological signals. In some embodiments, the control circuit 240 may read, store, process and analyze the target signals based on the sampling. Optionally, the control circuit 240 may also issue corresponding instructions according to the sampled data.

In some embodiments, the sampling of each processed target signal by the control circuit 240 may be performed after the control circuit 240 starts to receive each processed target signals for a time period. That is, after the switch circuit 220 switches the conduction channel, the control circuit 240 does not immediately sample the newly-conducted target signals, or even if the control circuit 240 samples the newly-conducted target signals, it does not immediately use the sampling results as a part of the target signals.

In some embodiments, the sampling frequency of the control circuit 240 may be related to a number of the signal acquisition circuit, a type of the target signal, and a target frequency. For example, the sampling frequency of each of the processed target signal by the control circuit 240 may be not less than twice of the target frequency of the control circuit. As an example only, for the EMG, assuming that the corresponding target frequency is less than or equal to 1000 Hz, the control circuit may sample the EMG at a sampling frequency of 2000 Hz. For the entire signal processing circuit, assuming that there are 4 acquisition circuits for acquiring EMGs, it is necessary to the control circuit 240 to provide a total sampling frequency of 8000 Hz, so as to ensure that the sampling frequency of each EMG reaches 2000 Hz.

In different situations, the control circuit 240 may control the switching of the switch circuit 220 based on different strategies.

In some embodiments, in order to enable subsequent sampling data to fully retain the information of each target signal (that is, the control circuit 240 may reconstruct each target signal based on the sampling data), the control circuit 240 may use a completely reconfigurable strategy to control the switching of the switch circuit 220. Under the completely reconfigurable strategy, the control circuit 240 may switch the input channels of the switch circuit 220 according to the total sampling frequency provided by the control circuit. For example, the frequency at which the switch circuit 220 switches input channels may be equal to the sampling frequency provided by the control circuit 240. In this case, the switch circuit 220 switches the input channels every time, that is, a signal acquisition circuit is conducted every time, the control circuit 240 may sample the target signals acquired by the signal acquisition circuits once. Moreover, since the sampling frequency of each target signal by the control circuit 240 is more than twice of the target frequency, the completely reconfigurable strategy may ensure that each target signal has at least two sampling points in each cycle.

Continuing to take four signal acquisition circuits for collecting EMGs as an example, assuming that the target frequency of each EMG is all less than or equal to 1 kHz, the control circuits may provide the sampling frequency of 2 kHz for every EMG. For the control circuits, a total sampling frequency of 8 kHz may be provided. The switch circuits may also switch between the four signal acquisition circuits at the frequency of 8 kHz, which switch once every 125 microseconds (µs), and the control circuits may sample the received electromyogram signals once between every two adjacent switches of the switch circuits.

Further, under the completely reconfigurable strategy, the control circuits may completely reproduce the corresponding multiple target signals based on the obtained sampling data. For example, the control circuits may reconstruct each target signal, and further analyze the frequency, phase, strength (amplitude) and other information of each target signal. Optionally, the control circuits may send the obtained sampling data or the reconstructed target signals to external processing circuits for analysis in a wired or wireless manner.

In some embodiments, the frequency at which the switch circuit 220 switches input channels may also be equal to half of the sampling frequency provided by the control circuit 240 or other fractional values. In this case, the switch circuit 220 switches the input channels every time, that is, a signal acquisition circuit is conducted every time, the control circuit 240 may sample the target signals acquired by the signal acquisition circuits twice. Continuing to take four signal acquisition circuits for collecting EMGs as an example, assuming that the target frequency of each EMG is less than or equal to 1 kHz, the control circuit may provide a sampling frequency of 2 kHz for each EMG. For the control circuits, a total sampling frequency of 8 kHz may be provided. The switch circuit only needs to switch between the four signal acquisition circuits at a frequency of 4 kHz, which switches once every 250 µs. The control circuits may sample the received EMGs twice between every two adjacent switches of the switch circuit. Compared the target signals acquired in this way with the case where the switch circuit only samples once between two adjacent switches of the switch circuits, since the sampling time points of each signal is not uniform enough, there may be a certain deviation in each target signal reconstructed based on the sampling data.

It should be known that, under the above-mentioned completely reconfigurable strategy, the number of channels that the control circuits process by using the time-division multiplexing method may be affected by the time of the rising edges and falling edges of the target signals. As an example only, if the frequency of the target signal is 500 Hz, the control circuits may provide a sampling frequency greater than 1 kHz for a single channel. At this time, the switching speed of the switch may need to reach 4 kHz when realizing time-division multiplexing of four channels. The dwell time of the switch circuits in the single channel may be only 250 µs, while the switching speed of the switch needs to reach 8 kHz when realizing time-division multiplexing of 8 channels, and the dwell time of the switch circuit in the single channel may be only 125 µs. Considering the influence of the rising edge and the falling edge, the dwell time of the switch circuit in each channel may not be too small. For example, if both the rising edge and the falling edge are 50 µs, in this case, the time-division multiplexing of up to 16 channels may be realized. Therefore, the rising edge time and the falling edge time, the number of channels, and the frequency range of the target signals may be generally considered comprehensively to gate the appropriate number of channels and the switching time of the corresponding channel.

In other embodiments, considering that the control circuit 240 may not be able to obtain valid sampling data (i.e., the rising edges and falling edges of the above signals cause the switch circuits to dwell on the single channel for too long, and the control circuits cannot acquire at least two valid data points within the period of the target signals) during the fast switching of the switch channels, the control circuit 240 may use a strength characterization strategy to control the switching of the switch circuit 220. Under the strength characterization strategy, the control circuit 240 may switch the input channels of the switch circuit 220 based on a preset frequency. The preset frequency may be related to cycles for the user to perform certain actions. For example, in order to analyze the EMGs generated by the muscles when the user performs strength trainings, the preset frequency may be a certain multiple of the frequency at which the user performs specific actions (e.g., bench press), causing that the switch circuit 220 may conduct each signal acquisition circuit multiple times during a cycle when the user performs the specific actions, so that the control circuit 240 may respectively perform multiple samplings on each target signal.

Continuing to take four signal acquisition circuits for collecting EMGs as an example, assuming that the user performs certain actions at a speed of 1 per second, if the control circuits sample 10 times on each target signal under an action, then the switching speeds of the switch circuits may be 40 times per second. When switching to signal acquisition circuits, the control circuit first may wait for the signals to be stable, and then continuous sampling until the 25 milliseconds (ms) of the signals are over. In this case, the switching speeds of the switch circuits may be independent of the overall sampling frequency of the control circuits. The control circuits may use a high total sampling frequency to achieve the effect of acquiring the high-frequency signals in the target signals.

Further, under the strength characterization strategy, the control circuits may obtain the strength information of the target signals based on the obtained sampling data. For example, under the strength characterization strategy, the control circuits may continuously sample the target signals generated by the single signal acquisition circuits within a time period. The control circuits may calculate strengths of the target signals acquired by the signal acquisition circuits during the time period based on the continuously sampled data, for example, calculating average values of the continuously sampled data, or the like. Of course, the control circuits may also calculate the strengths of the target signals based on all the sampling data corresponding to the signal acquisition circuits. Furthermore, when the control circuits calculate the strengths of the target signals corresponding to the same signal acquisition circuits in multiple discontinuous time periods, the control circuits may generate the relationship between the target signal strength and the time based on the signal strengths and the corresponding time, so as to extract the specific frequency information of the target signals.

In some embodiments, the strength characterization strategy may acquire partial frequency information when acquiring strength information. Under the strategy, since the signals of all time periods are not completely acquired, part of the signal information may be lost, so part of the frequency information may be lost. As an example only, the total frequency of 40 Hz may be configured to control the switch circuits for switching. In the case of four signal acquisition circuits, the acquisition time length of each input channel may be 25 ms. At this time, there may be a certain loss in the acquisition of low-frequency signals whose signal frequency is less than 40 Hz. However, if the signals acquired in each section (i.e., the signals sampled multiple times after a single channel switch) are processed into a representative value (e.g., an average value is extracted from the signals acquired every 25 ms), there are 10 representative values of the single channel within 1 s, then the signal with a frequency below 5 Hz may be reconstructed by using the processing method of the completely reconfigurable strategy.

In some embodiments, the ability of time-division multiplexing under the strength characterization strategy may be related to the frequency of user actions and the monitoring accuracy requirements for user actions, and due to the long duration of single channel acquisition, it may be less affected by rising edge and falling edge. In some embodiments, the frequency of the target signals may be too low to limit the number of channels for time-division multiplexing under the strategy, so the ability of time-division multiplexing may also be related to the frequency of the target signals. Due to the need to extract the frequency and strength information of the target signals, it is difficult to acquire for low-frequency signals, such as signals with a frequency below 40 Hz. In this case, the number of time-division multiplexing may be reduced, that is, the number of signal acquisition circuits may be reduced.

In some embodiments, the control circuit 240 may adjust specific switch control strategies according to actual conditions. For example, the control circuit 240 may switch between a completely reconfigurable strategy and the strength characterization strategy. The selection or switching between the completely reconfigurable strategy and the strength characterization strategy may be judged according to delay times of the circuits (e.g., rising edge time and falling edge time) and signal-to-noise ratio requirements of the circuits. For example, when the delay times of the circuits are long and the target signal frequency, the number of signal acquisition circuits, and the magnification of the analog circuits cannot be changed, the control circuit 240 may gate a strength characterization strategy. For another example, when appropriate filter circuits are added to the analog circuit to improve the signal-to-noise ratios, the control circuit 240 may gate the strength characterization strategy considering that the filter circuits may cause longer delay times. On the contrary, when the delay time of the circuits are relatively short or the requirements for the signal-to-noise ratio are not high, the control circuit 240 may gate the complete reconstruction strategy. In some embodiments, the control circuit 240 may adjust the switch control strategies according to environmental factors or user instructions. For example, assuming that different switch control strategies correspond to different power consumption speeds, the control circuit 240 may adjust the switch control strategies according to the power status of the power supply (e.g., batteries). When the powers of the power supply are low, switch control strategies with low power consumption speeds are gated. For another example, the control circuit 240 may adjust the switch control strategies according to the user's input instructions to meet different needs of the user.

It should be noted that the above descriptions about the process 300 may be only for illustration and description, and does not limit the scope of application of the present disclosure. For those skilled in the art, various modifications and changes may be made to the process 300 under the guidance of the present disclosure. However, such modifications and changes remain within the scope of the present disclosure.

Figure 4A:
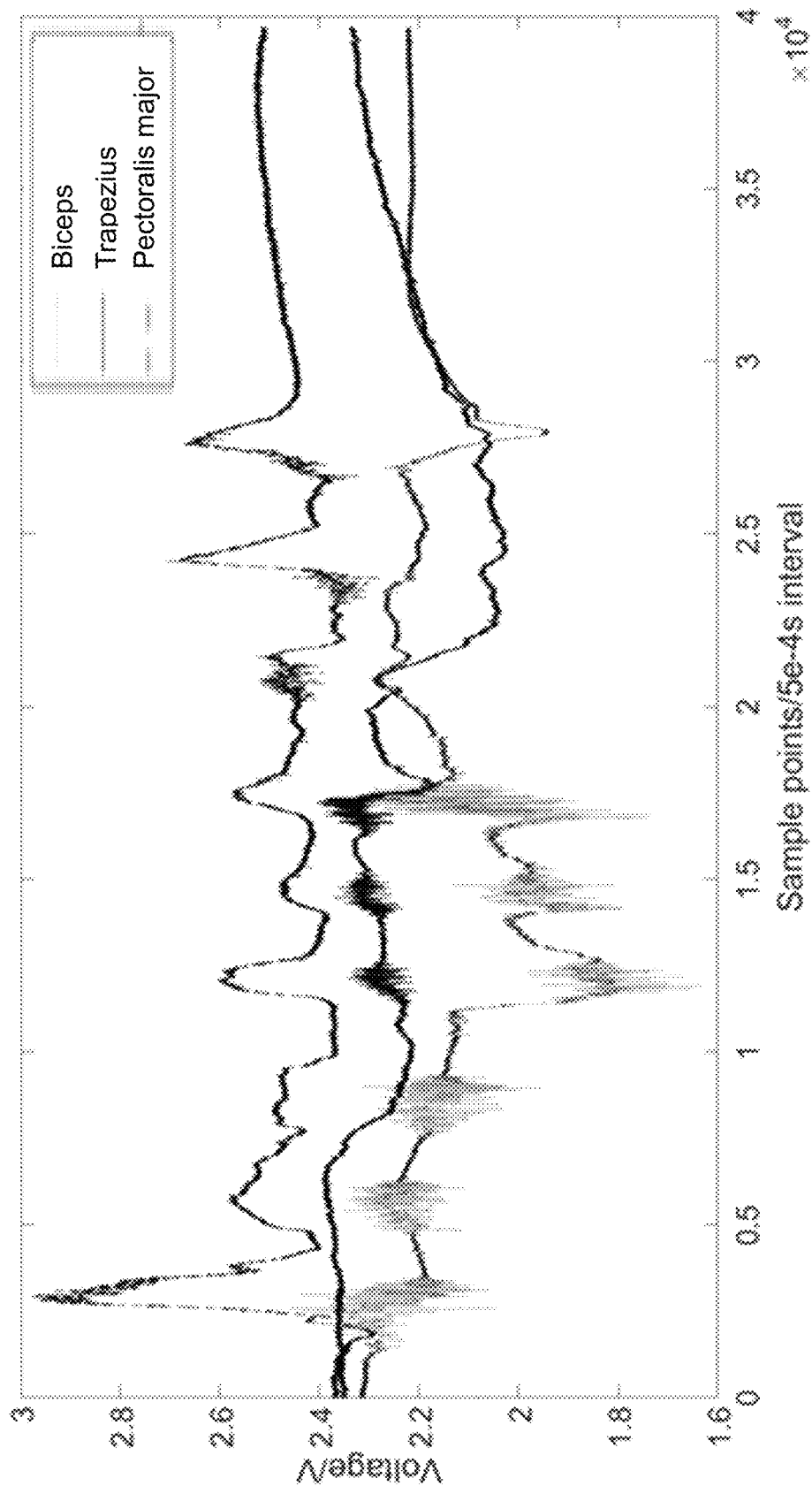
FIGS. 4A-4B are exemplary images of baseline drift problems according to some embodiments of the present disclosure.
Figure 4B:
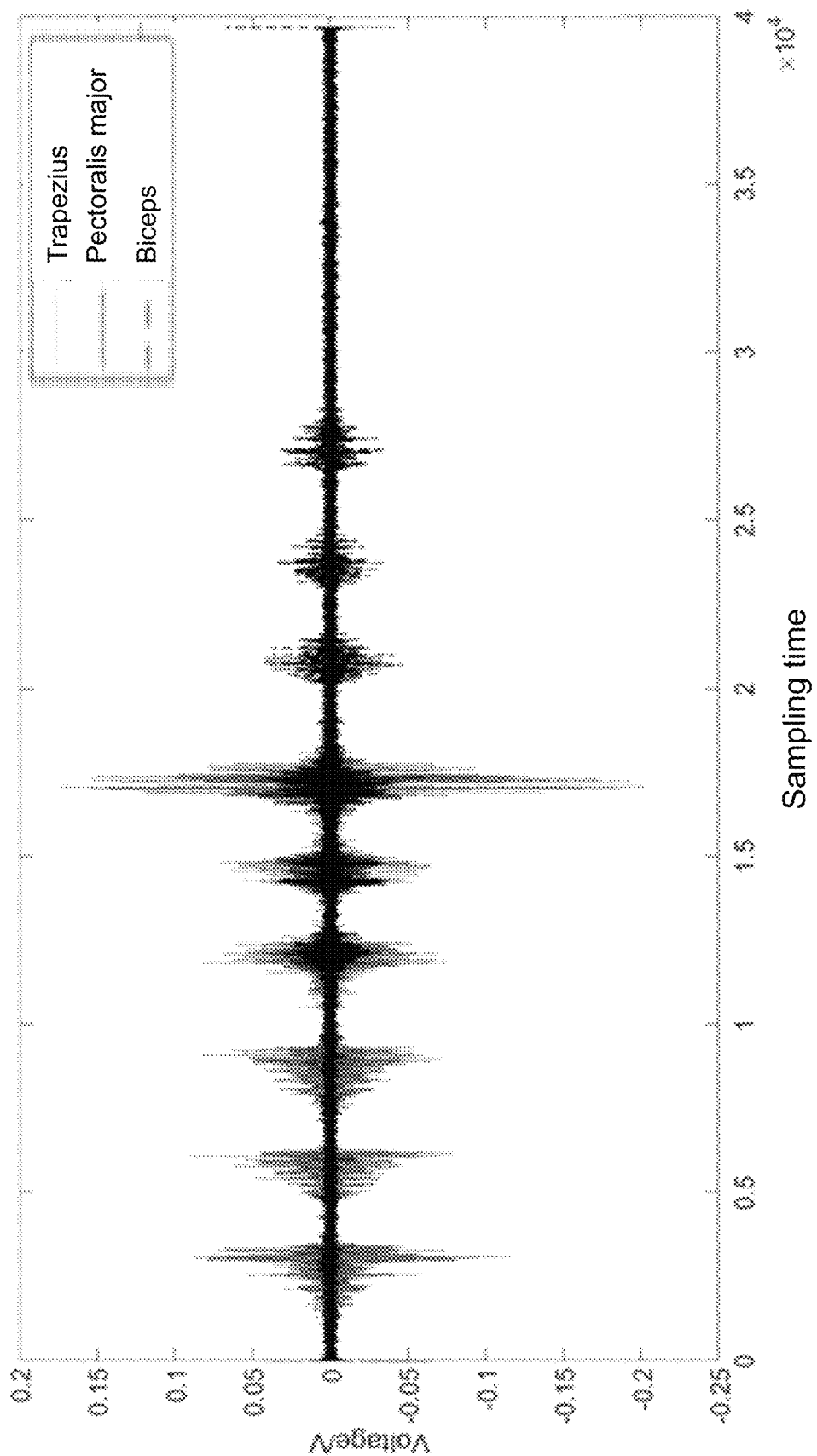

FIGS. 4A-4B are exemplary images of the baseline drift problem according to some embodiments of the present disclosure.

In some embodiments, due to factors such as the potentials of the stratum corneum on the surface of the human body, the signal sampled by the control circuit 240 may have baseline drifts. For the baseline drift problems, in some embodiments, the baseline drift problems may be solved by reducing the gains of the analog circuit 230 to the target signals, and/or gating a control chip with high-precision ADC channels, and/or choosing to use resistance to adjust the reference potential drift, and/or the baseline drift may be filtered out by choosing to add high-pass filtering in the analog circuit 230.

In some embodiments, since there is a limit value in the baseline drift, small gains may be configured to control the baseline drift not to exceed the output capability of the signal processing circuits, so that distortion does not occur. For example, when the target signals are transmitted to the analog circuits, the analog circuits may amplify the target signals. In order to solve the baseline drift problems, the magnification of the target signals by the analog circuit may be appropriately reduced so that the amplified signals may not be distorted.

In some embodiments, if the magnification (gain) of the target signals is reduced, other problems may be caused, for example, high requirements for noise controls after the outputs of the analog circuits. Although the gains cannot help improve the signal-to-noise ratios of the output signals of the analog circuits, if the parts after the analog circuits introduce noise, then large gains may improve the signal-to-noise ratios of the entire circuits, so at small gains, strict control of the noise may be required. Since the physiological signals are generally weak, in the case of such small gains, a control circuit with a high-precision ADC may be necessary to choose to obtain sufficient resolutions and avoid entering more noise after the analog circuit.

As an example only, if the strength of the EMG is 0.1 mV, for the situation of 12-bit ADCs powered by 3.3 V, the resolution is only 0.8 mV, even if the EMG gains 10 times, the obtained results may also be distorted seriously. However, if a 16-bit ADC is used, the resolution may reach 0.05 mV, and even if the EMG gains 10 times, a better signal restoration may be obtained. In some embodiments, a 60 times gain, 3.3 V power supply, and 16-bit ADC scheme may be selected.

In some embodiments, in the case of dry electrodes acquiring myoelectricity, the effect of using a time-division multiplexing circuit to acquire EMGs at the trapezius, pectoralis major, and biceps is shown in FIG. 4A. The figure shows the original appearances of the signals acquired by the small gain and high precision method. It can be seen that the three-channel sampling signals in the image have obvious baseline drift problems. The small gain and high precision method uses a 60 times gain, 3.3 V power supply, and a 12-bit ADC scheme. It can be seen from the figure that due to the small gain, the baseline drift does not exceed the output capability range of the signal processing circuits, and no saturation distortion occurs. FIG. 4B shows the image processed by the 60 Hz-500 Hz algorithm bandpass filter. It can be seen from the figure that under the small gain and high precision scheme, the baseline drift may be controlled within a certain range, the image after filtering does not have the baseline drift problems.

In some embodiments, the baseline drift problems may also be solved by adding high-pass filter circuits in the signal processing circuits. In some embodiments, the high-pass filter circuits may be added to the analog circuit, and may be gated to be arranged before the main gains to avoid saturation. In this case, the effect of large gains and zero drift may be achieved at the same time. However, if the high-pass filter circuits are added to the analog circuit, problems such as longer rising edge time and falling edge time may be caused. Therefore, it is necessary to adjust and gate appropriate parameters to achieve the purpose of being compatible with the time-division multiplexing function.

In some embodiments, the high-pass filter circuits may be added when the target frequency is relatively low, because when the target frequency is relatively low, the sampling time of each channel may be relatively long. For example, the EMG whose target frequency is within 250 Hz may be chosen. Under the completely reconfigurable strategy, if the sampling frequency of the single channel only needs to be 500 Hz, and the sampling frequency of four-channel time-division multiplexing may only need to be 2000 Hz, so the dwell times of the single channel may be extended to 500 µs. As a comparison, under the completely reconfigurable strategy, if the target frequency of the EMG is 1000 Hz, the sampling frequency of the single channel may be required to be 2000 Hz, and the sampling frequency of the four-channel time-division multiplexing may be required to be 8000 Hz, then the dwell time of the single channel may be 125 µs. If the rising edge time and the falling edge time is greater than 125 µs (there may be switch delays, voltage swing and stabilization time of each chip, etc.), accurate sampling signals may not be obtained, and the filter circuits in the analog circuit may also be appropriately reduced for optimization at this time.

Figure 5A:
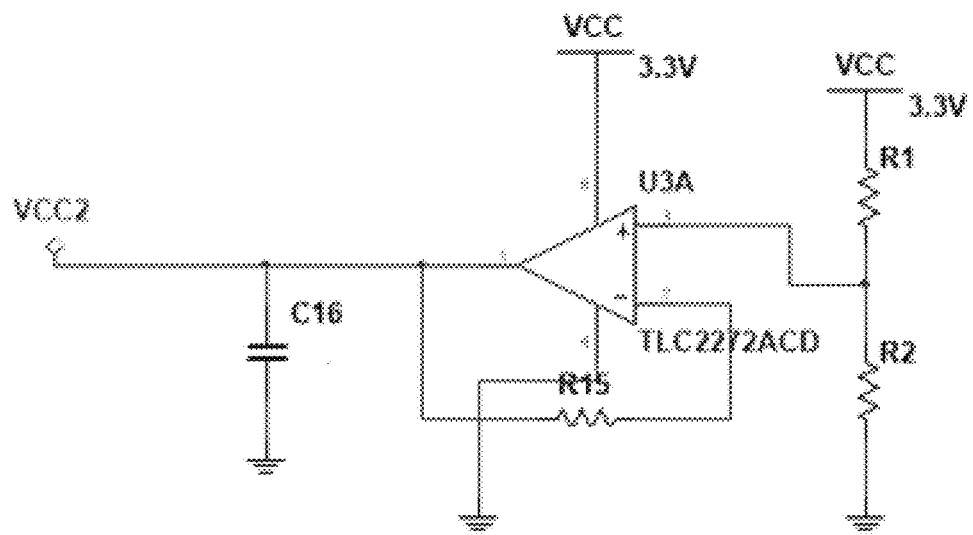
FIGS. 5A-5C are exemplary circuit diagrams of a reference potential controlled by program according to some embodiments of the present disclosure.
Figure 5B:
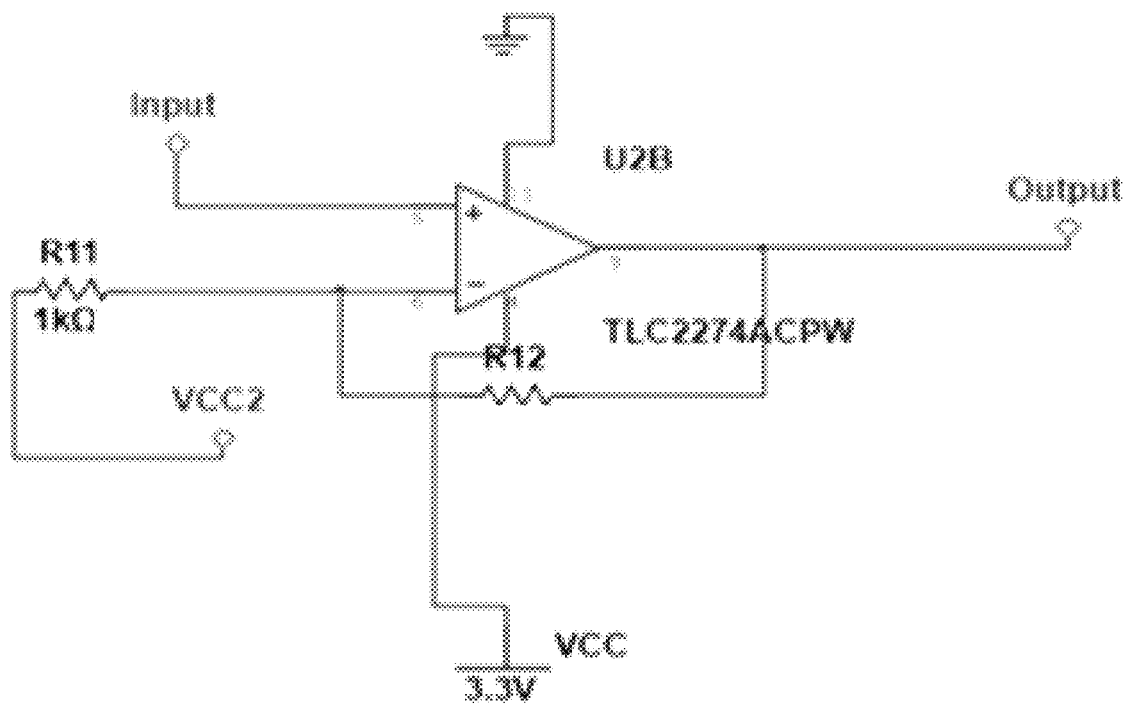
Figure 5C:
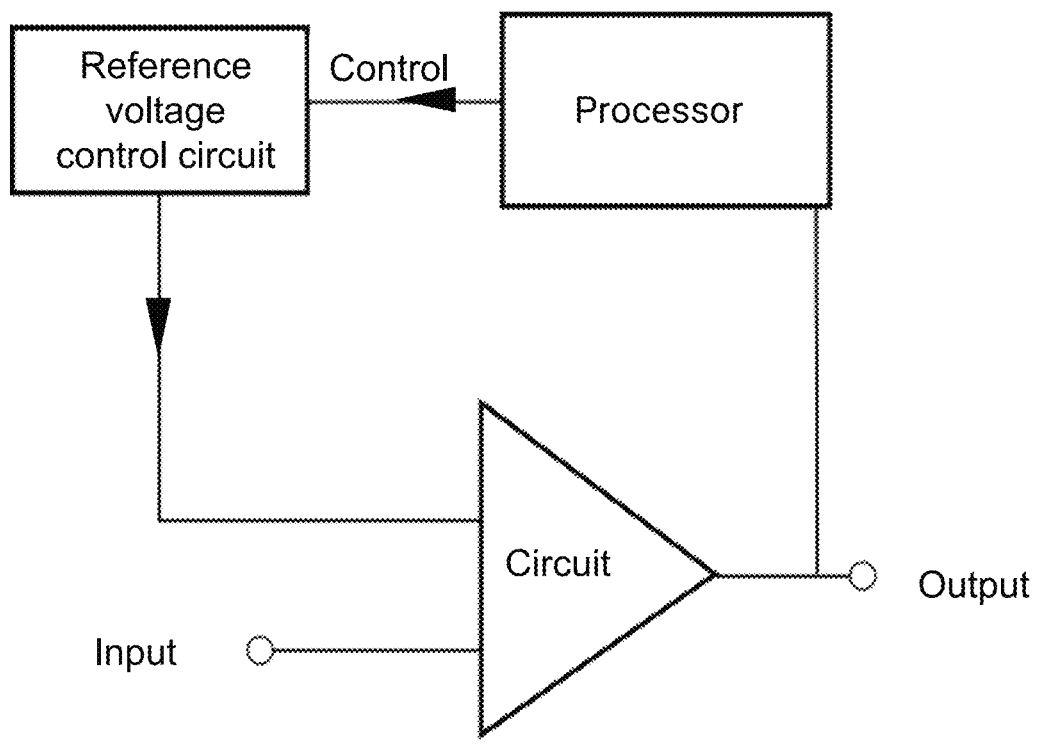

FIG. 5A-5C are exemplary circuit diagrams of a reference potential controlled by program according to some embodiments of the present disclosure.

In some embodiments, the changes of the baseline drift may be relatively slow and also present the phenomenon of fixed drift within a certain time period, the baseline may be programmed to a certain extent so as to solve the baseline drift problems by designing the reference potentials of the circuits. In some embodiments, when the baseline drift makes the signals approach to an upper limit of the saturation voltages, the reference potentials may be controlled to decrease by the program. Conversely, when the baseline drift makes the signals approach to a lower limit of the voltage, the reference potentials may be controlled to increase by the program. The reference potentials may be virtual grounds in the circuits, which are configured to raise the circuits to a certain potential to ensure that the obtained signal values are all positive values, so that the control circuit may read the received signals.

In the circuit diagram shown in FIG. 5A, after utilizing resistance R1 and resistance R2 to carry out voltage division, the input and the output are isolated by amplifiers to avoid the influence of the output end, finally the voltage value of VCC2=VCC*R2/(R1+R2) at the output end may be output. It can be seen from the figure that the value of VCC2 may be changed by adjusting the values of R1 and R2. If VCC2 is used as the reference potential of the circuit, and then the values of R1 and R2 may be controlled through a computer program, then the reference potential may be controlled by program. In some embodiments, R1 may be replaced by a switch-controlled resistor network R, and resistors with different resistance values may be connected with the circuit through different switch gating, thereby realizing the change of the resistance value of R. similarly, R2 may be adjusted or R1 and R2 may be adjusted at the same time.

In the circuit diagram shown in FIG. 5B, the negative input of the amplifier in the figure may be connected with VCC2, and under normal circumstances, the negative input of the amplifier may be connected with ground, that is, VCC2=0 V. For controlling the baseline by program, the value of VCC2 may be chosen to initialize to a certain value, for example, the value of VCC2 may be initialized to one-half of the power supply voltage, then the potential of the entire circuit may be increased, so that the output of the circuit is always greater than or equal to 0 V, the circuit does not need to be powered by positive and negative voltages, and the processing of battery power may be increased. In such a case, it not only satisfies the requirements of the ADC to read the signals, but also facilitates the battery to supply powers to the circuit (the battery is positive voltage). If the reference potential VCC2 is 0 V, then the circuit may need to be powered by positive and negative voltages, the processing power supply of battery is added, and the processing of increasing the voltage may also be done at the output to meet the requirements of ADC reading.

FIG. 5C shows a schematic diagram of a baseline controlled by program, which may include a processor, a reference voltage control circuit, and an amplifier circuit. The reference voltage control circuit may be configured to change the reference voltage of the reference potential, and the processor may be configured to control the reference voltage control circuit to change the value of the reference voltage according to the output result, so as to achieve the purpose of adjusting the reference potential. In some embodiments, the processor may monitor and adjust the output of the amplifying circuit in real time, and set a certain threshold (e.g., two thresholds may be set, the first threshold is the upper limit, and the second threshold is the lower limit to control the output voltage within a certain range), when the detected output voltage exceeds a certain threshold, the processor may control the reference voltage control circuit to change the reference voltage of the reference potential.

Only as an example, when the output capability of the amplifying circuit is in a range of 0-3 V, the first threshold may be set as 90% of the maximum value (2.7 V), and the second threshold may be set as 10% of the maximum value (0.3 V). When the processor detects that the voltage output of the amplifying circuit exceeds 2.7 V, adjustment may be trigged, the reference voltage control circuit may be controlled to reduce the reference potential by a certain value (for example, the reduced value of the reference potential may be the difference between the detected output voltage value and the initial reference potential, and for another example, the reduced value of the reference potential may be a certain fixed value). Similarly, when the processor detects that the voltage output of the amplifying circuit is lower than 0.3 V, the adjustment may also be triggered, and the reference voltage control circuit may be controlled to increase the reference potential by a certain value (for example, the increased value of the reference potential may be the difference between the detected output voltage value and the initial reference potential, and for another example, the increased value of the reference potential may be a certain fixed value). It should be noted that the reduced reference potential cannot be less than 0 V, if the reduced reference potential is less than 0 V, and the reference potential may only drop to 0 V at most. The increased reference potential cannot be greater than 3 V, if the increased reference potential is greater than 3 V, the reference potential may only be increased to 3 V at most. That is, the changed reference voltage value cannot exceed the range of the output voltage value of the amplifier circuit. It should also be noted that in order to filter out the influence of the baseline controlled by program in the final result by filtering (for example, if the frequency of the baseline controlled by program is less than 10 times per second, and the frequency of the EMG is gated to be above 20 Hz, the influence of the baseline controlled by program may be removed by filtering with a 20 Hz high-pass algorithm), the frequency of the adjustment of the reference potential may not be too high. In some embodiments, the speed of the adjustment controlled by program may be related to the speed of the baseline drift of the target signal, the threshold value set by the processor, and the adjusted value of the reference potential after triggering the adjustment.

In summary, the reference level of the signal may be changed by changing the reference potential of the reference point, and the reference potential may be controlled by program at the same time, such that the baseline may be controlled by program to solve the baseline drift problem.

In some embodiments, the method of controlling the reference potential by program in FIGS. 5A-5C may also be applicable to the situation of positive and negative power supplies, and the initialization of the reference potential is 0 V.

Figure 6A:
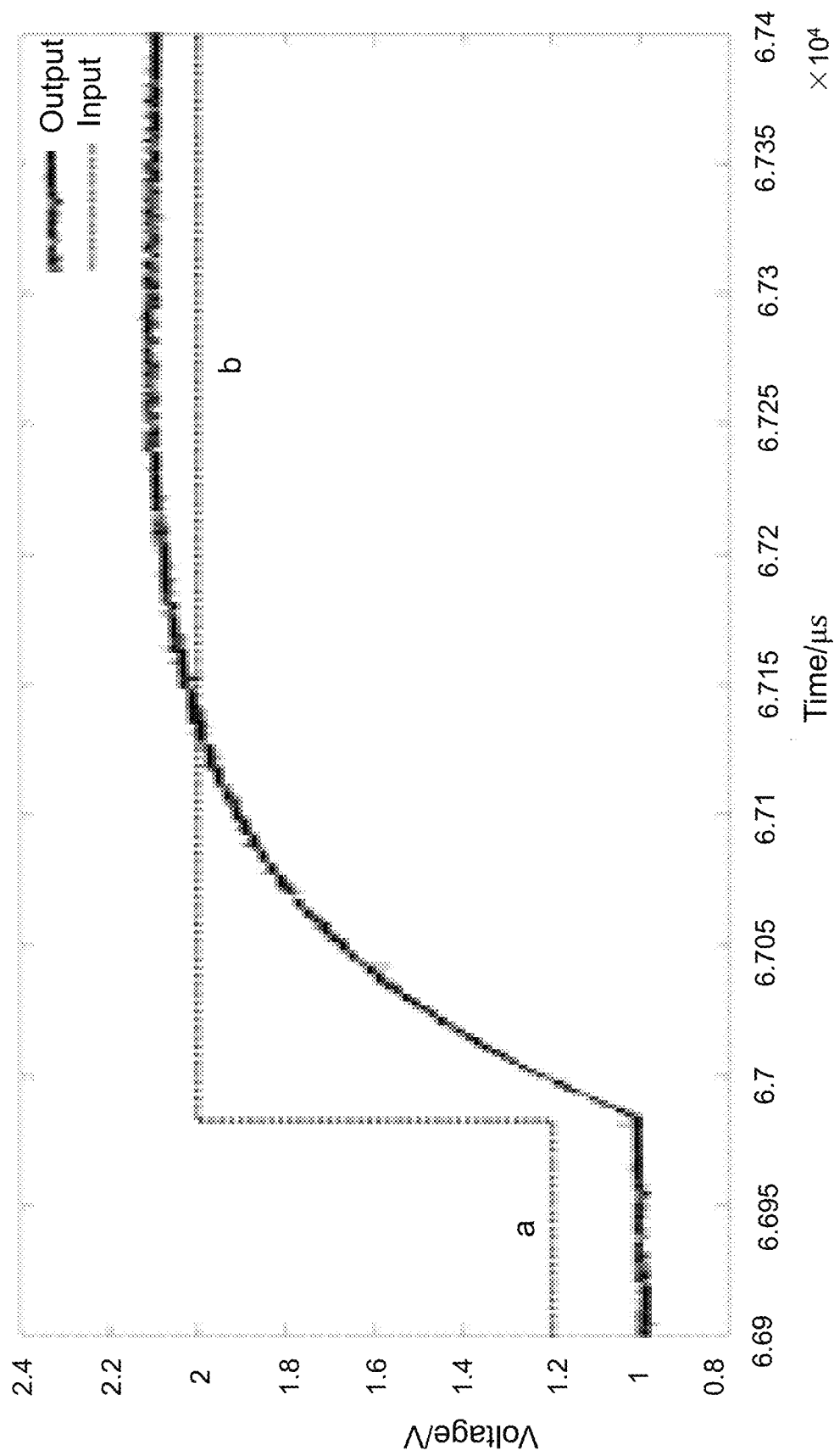
FIGS. 6A-6B are exemplary images of the channel crosstalk problem according to some embodiments of the present disclosure.
Figure 6B:
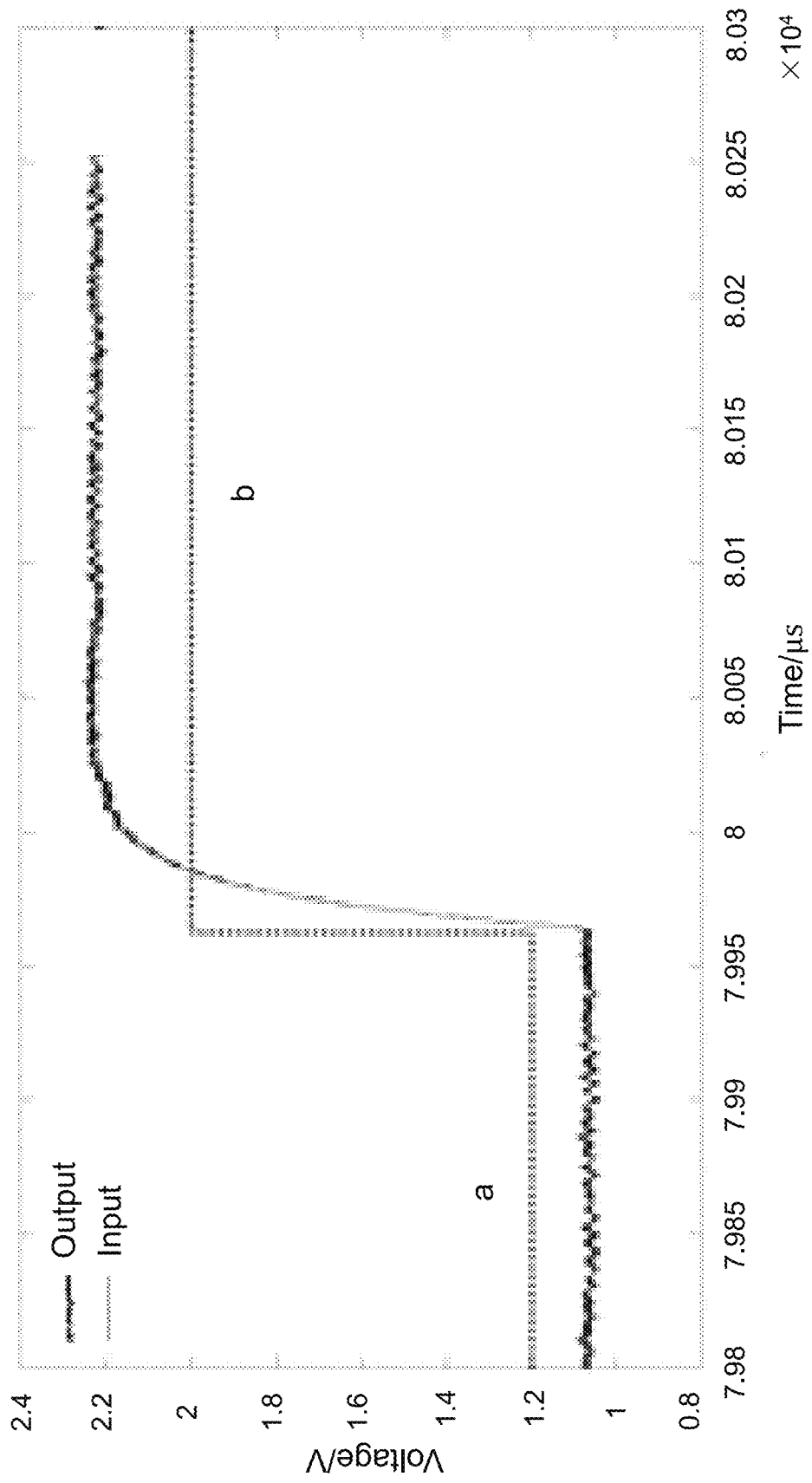

FIGS. 6A-6B are exemplary images of the channel crosstalk problem according to some embodiments of the present disclosure.

In some embodiments, the time-division multiplexing may be affected by the falling edge time of the entire circuit. The falling edge time may represent the time required for the voltage to drop from one value to another and be stabilize. Before and after the switching of the switch, if there is not enough time for the voltage of the previous channel to be fully released, crosstalk between channels may be caused, and part of the information of the channel before switching may be retained in the switched channel.

In some implementations, the crosstalk between the various input channels may be reduced to a certain extent by adopting the signal processing method of the time-division multiplexing circuit and sampling after the channel is stable. In the case of simultaneous signal transmission through multi-channel, each input channel has a signal at the same time. If the signals of each channel are large, but the input lines of each channel overlap and the insulation are not good enough, then there may be crosstalk between each channel. However, in the time-division multiplexing method, only one channel is conducted at the same time, and the other channels are in the closed state without current, which may effectively avoid the crosstalk problem of the above-mentioned multi-channel circuits.

In some embodiments, as shown in FIGS. 6A and 6B, the dotted line in the figure may represent the original signal of the input circuit after processing, and the solid line may represent the signal with delay formed by the original signal passing through the circuit in the present disclosure. The abscissa may represent the time, and the ordinate may represent the voltage value. The ordinate of the dotted line may be not the voltage value in the actual sense, but only used as a time reference for the solid line. In some embodiments, a function generator may be used as a signal source to send out square waves, and two outputs of the function generator may gate a same mode (ensuring that the two phases are consistent), and one-channel signal of the function generator may be connected with an input end of the circuit, and the output end of the circuit may be connected with an oscilloscope, and the data read by the oscilloscope at the output end of the circuit may be plotted in the figure above (solid line). The other channel of the function generator may be directly connected to the oscilloscope for reading data. The data may indicate the phase of the input signal of the circuit. The data is processed (by changing its strength value to be comparable to the solid line for intuitive observation) and plotted in the above figure (dotted line). The processing may refer to gating a threshold point (the average value of the value before and after the signal jumps), assigning values to points greater than the threshold and less than the threshold, for example, points less than the threshold may be assigned a, and points greater than the threshold may be assigned b. In summary, it may be seen from the figure that the jump voltage value is a key factor affecting the delay.

The beneficial effects that the embodiments of the present disclosure may bring include but are not limited to: (1) achieving the purpose of saving space cost and reducing hardware requirements under the situation that guarantees the acquisition and the processing of multiple signal sources by adopting the method of time-division multiplexing; (2) when multiple input channels have signals at the same time, reducing the crosstalk between each input channel; (3) completely reproducing the corresponding multiple target signals based on the obtained sampling data by the completely reconfigurable strategy; (4) under the strength characterization strategy, obtaining the strength information and partial frequency information of the target signals based on the obtained sampling data; (5) solving the problems of possible baseline drift through the method of small gain and high precision ADC, the baseline controlled by program and adding high-pass filter circuit.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been configured to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment," "one embodiment," or "an alternative embodiment" in various portions of the present disclosure are not necessarily all referring to the same embodiment. Furthermore, the features or structures may be combined as suitable in one or more embodiments of the present disclosure.

In addition, those skilled in the art may understand that the various aspects of the application may be illustrated and described by several patentable categories or situations, including combination of any new and useful process, machine, product or substances, or any new and useful improvement thereof. Correspondingly, various aspects of the application may be entirely executed by hardware, may be entirely executed by software (including firmware, resident software, microcode, etc.), or may be executed by a combination of hardware and software. The above hardware or software may be referred to as "block", "module", "engine", "unit", "element" or "system". In addition, aspects of the application may be embodied as a computer product on one or more computer-readable media, the product including computer-readable program code.

A computer storage medium may contain a propagated data signal embodying the computer program code, for example, in baseband or as part of a carrier wave. The propagated signal may have various manifestations, including electromagnetic forms, optical forms, etc., or a suitable combination. The computer storage medium may be any computer-readable medium, other than a computer-readable storage medium, which may be connected to an instruction execution system, apparatus, or device to communicate, or propagate or transmit the program for use. The program codes residing on a computer storage medium may be transmitted over any suitable medium, including radio, electrical cable, fiber optic cable, RF, or the like, or any combinations thereof.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various elements described above may be embodied in a hardware apparatus, it may also be implemented as a software-only solution—e.g., an installation on an existing server or mobile apparatus.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties configured to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters arranging forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present disclosure are not limited to that precisely as shown and described.

What is claimed is:

1. A signal processing circuit, comprising a control circuit, a switch circuit, an analog circuit, and at least two signal acquisition circuits, wherein
the at least two signal acquisition circuits are configured to acquire at least two-channel target signals;
the switch circuit is configured to control conduction between the at least two signal acquisition circuits and the analog circuit, so that the target signal collected by a part of the at least two signal acquisition circuits is transmitted to the analog circuit at the same time;
the analog circuit is configured to process the received target signal; and
the control circuit is configured to receive the processed target signal, and sample the processed target signal, wherein each of the at least two-channel target signals includes a target frequency, and a sampling frequency of each of the processed target signal by the control circuit is not less than twice of the target frequency.

2. The signal processing circuit of claim 1, wherein the switch circuit includes a plurality of input channels, each of the at least two signal acquisition circuits is connected to an input channel independently, and the switch circuit selects one input channel for conduction between the at least two signal acquisition circuits and the analog circuit based on control signal of the control circuit at the same time.

3. The signal processing circuit of claim 1, wherein the control circuit reconstructs each of the target signal based on a sampling result.

4. The signal processing circuit of claim 1, wherein the control circuit switches a switch of the switch circuit based on a sum of sampling frequencies of the at least two-channel target signals.

5. The signal processing circuit of claim 1, wherein the control circuit switches a switch of the switch circuit based on a preset frequency.

6. The signal processing circuit of claim 5, wherein the control circuit obtains strength information of each of the target signal based on a sampling result.

7. The signal processing circuit of claim 1, wherein the analog circuit includes a differential amplifier, and the switch circuit is a switch chip with dual outputs.

8. The signal processing circuit of claim 7, wherein the analog circuit further includes a filter circuit.

9. The signal processing circuit of claim 1, wherein the sampling the processed target signal by the control circuit is performed after the control circuit starts to receive the processed target signal for a time period.

10. A signal processing method, comprising:
acquiring, by at least two signal acquisition circuits, at least two-channel target signals;
controlling, by a switch circuit, conduction between the at least two signal acquisition circuits and the analog circuit, so that the target signal collected by a part of the at least two signal acquisition circuits is transmitted to the analog circuit at the same time;
processing, by an analog circuit, the received target signal; and
receiving, by the analog circuit, the processed target signal, and sampling, by a control circuit, the processed target signal, wherein each of the at least two target signals includes a target frequency, and a sampling frequency of each of the processed target signal by the control circuit is not less than twice of the target frequency.

11. The signal processing method of claim 10, wherein the switch circuit includes a plurality of input channels, and each of the at least two signal acquisition circuits is connected to an input channel independently, and the switch circuit selects one input channel for conduction between the at least two signal acquisition circuits and the analog circuit based on control signal of the control circuit at the same time.

12. The signal processing method of claim 10, wherein the method includes:
reconstructing, by the control circuit, each of the target signal based on a sampling result.

13. The signal processing method of claim 10, wherein the method includes:
switching, by the control circuit, a switch of the switch circuit based on a sum of sampling frequencies of the at least two-channel target signals.

14. The signal processing method of claim 10, wherein the control circuit switches a switch of the switch circuit based on a preset frequency.

15. The signal processing method of claim 14, wherein the method includes:
obtaining, by the control circuit, strength information of each of the target signal based on a sampling result.

16. The signal processing method of claim 10, wherein the analog circuit includes a differential amplifier, the switch circuit is a switch chip with dual outputs, and the method includes:
amplifying, by the differential amplifier, the received target signal.

17. The signal processing method of claim 16, wherein the analog circuit further includes a filter circuit, and the method includes:
performing, by the filter circuit, filtering processing on the received target signal.

18. The signal processing method of claim 10, wherein the sampling the processed target signal by the control circuit is performed after the control circuit starts to receive the processed target signal for a time period.

19. The signal processing method of claim 10, wherein a frequency of the target signal is within a range of 0.05 Hz-2 KHz.

20. A non-transitory computer-readable storage medium storing a set of instructions, when executed by at least one processor, causing the at least one processor to execute a signal processing method, the method comprising
  acquiring, by at least two signal acquisition circuits, at least two-channel target signals;
  controlling, by a switch circuit, conduction between the at least two signal acquisition circuits and the analog circuit, so that the target signal collected by a part of the at least two signal acquisition circuits is transmitted to the analog circuit at the same time;
  processing, by an analog circuit, the received target signal; and
  receiving, by the analog circuit, the processed target signal, and sampling, by a control circuit, the processed target signal, wherein each of the at least two target signals includes a target frequency, and a sampling frequency of each of the processed target signal by the control circuit is not less than twice of the target frequency.

* * * * *